(12) United States Patent
Sharma et al.

(10) Patent No.: US 11,807,227 B2
(45) Date of Patent: Nov. 7, 2023

(54) METHODS AND APPARATUS TO GENERATE VEHICLE WARNINGS

(71) Applicant: Intel Corporation, Santa Clara, CA (US)

(72) Inventors: Sridhar Sharma, Palo Alto, CA (US); Patrick Mead, Portland, OR (US); Ignacio Alvarez, Portland, OR (US); Kathiravetpillai Sivanesan, Portland, OR (US); Justin Gottschlich, San Jose, CA (US); Shahab Layeghi, Redwood City, CA (US); Liuyang Lily Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 16/399,967

(22) Filed: Apr. 30, 2019

(65) Prior Publication Data
US 2019/0256088 A1    Aug. 22, 2019

Related U.S. Application Data

(60) Provisional application No. 62/755,070, filed on Nov. 2, 2018.

(51) Int. Cl.
*B60W 30/09*    (2012.01)
*B60W 30/095*    (2012.01)
(Continued)

(52) U.S. Cl.
CPC ........ *B60W 30/09* (2013.01); *B60W 30/0956* (2013.01); *B60W 50/14* (2013.01);
(Continued)

(58) Field of Classification Search
CPC .. B60W 30/09; B60W 30/0956; B60W 50/14; B60W 2050/146; B60W 2420/42; G06K 9/00805; G06K 9/00825
See application file for complete search history.

(56) References Cited

U.S. PATENT DOCUMENTS 6,575,902 B1 *   6/2003   Burton ................. B60W 40/08
                                                          600/595
9,697,733 B1 *   7/2017   Penilla ..................... B60L 58/12
(Continued)

OTHER PUBLICATIONS

Jonathan Petit, Florian Schaub, Michael Feiri, and Frank Kargl, "Pseudonym Schemes in Vehicular Networks: A Survey", Aug. 7, 2014 (Year: 2014).*

(Continued)

*Primary Examiner* — Dale W Hilgendorf
*Assistant Examiner* — Hana Lee
(74) *Attorney, Agent, or Firm* — Hanley, Flight & Zimmerman, LLC

(57) ABSTRACT

Methods and apparatus to generate vehicle warnings are disclosed. An example apparatus includes a sensor to detect a vehicle, where the sensor is associated with an observer of the vehicle, an object tracker to determine a motion of the vehicle, an accident estimator to calculate a likelihood of a collision of the vehicle based on the determined motion, and a transceiver to transmit a message to the vehicle upon the likelihood of the collision exceeding a threshold, where the message includes information pertaining to the collision.

38 Claims, 14 Drawing Sheets

(51) Int. Cl.
*B60W 50/14* (2020.01)
*G06V 20/58* (2022.01)
*G06V 10/764* (2022.01)

(52) U.S. Cl.
CPC ............ *G06V 10/764* (2022.01); *G06V 20/58* (2022.01); *G06V 20/584* (2022.01); *B60W 2050/146* (2013.01); *B60W 2420/42* (2013.01)

(56) References Cited

U.S. PATENT DOCUMENTS

| | | | | |
|---|---|---|---|---|
| 11,507,102 | B2* | 11/2022 | Ferguson | G05D 1/0231 |
| 2007/0030212 | A1* | 2/2007 | Shibata | G06T 5/50 |
| | | | | 345/9 |
| 2009/0140881 | A1* | 6/2009 | Sakai | B60R 1/00 |
| | | | | 340/901 |
| 2009/0237269 | A1* | 9/2009 | Okugi | G08G 1/163 |
| | | | | 340/901 |
| 2012/0283895 | A1* | 11/2012 | Noda | B60W 30/0953 |
| | | | | 701/1 |
| 2014/0372016 | A1* | 12/2014 | Buchholz | G08G 1/166 |
| | | | | 701/117 |
| 2016/0071417 | A1* | 3/2016 | Lewis | G08G 1/162 |
| | | | | 701/301 |
| 2018/0151077 | A1* | 5/2018 | Lee | B60Q 9/008 |
| 2018/0319280 | A1* | 11/2018 | Kim | G08G 1/163 |
| 2018/0365999 | A1* | 12/2018 | Wiklinska | G08G 1/164 |
| 2019/0143967 | A1* | 5/2019 | Kutila | G08G 1/162 |
| | | | | 701/23 |
| 2019/0375400 | A1* | 12/2019 | Zhang | B60W 50/14 |

OTHER PUBLICATIONS

Shalev-Shwartz et al., "On a Formal Model of Safe and Scalable Self-driving Cars," Mobileye, 2017, 33 pages.
Petit et al., "Pseudonym Schemes in Vehicular Networks: A Survey," IEEE Communication Surveys & Tutorials, vol. 17, No. 1, First Quarter 2015, 28 pages.
Gottschlich et al., "The Pillars of Machine Programming," Jun. 2018, Intel Labs, MIT, 11 pages.

* cited by examiner

| ATTRIBUTE CODE | ATTRIBUTE |
|---|---|
| 00 | LICENSE PLATE |
| 01 | COLOR |
| 02 | TYPE |
| 03 | MANUFACTURER |
| 04 | MODEL |
| 05 | LANE # |
| 06 | LOCATION |
| 07 | SPEED |

FIG. 8

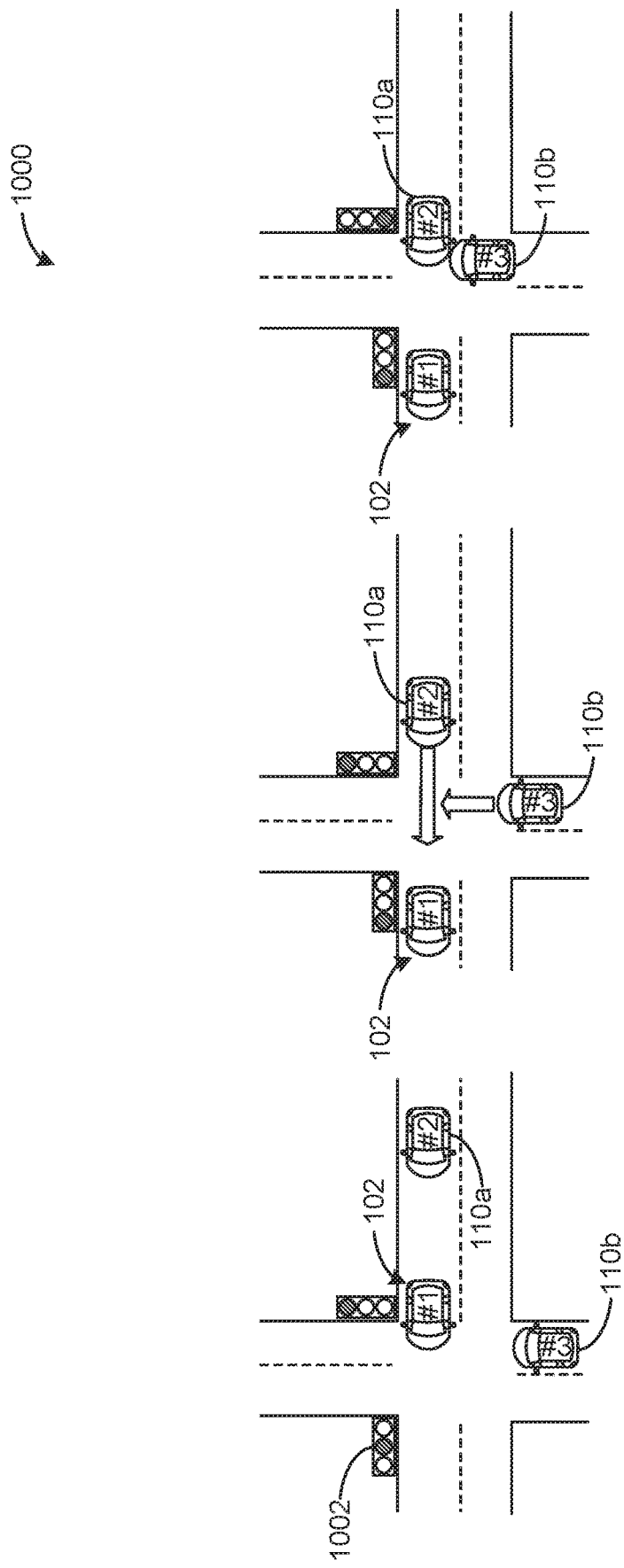

METHODS AND APPARATUS TO GENERATE VEHICLE WARNINGS

RELATED APPLICATION

This patent claims priority to and the benefit of U.S. Provisional Patent Application Ser. No. 62/755,070, which was filed on Nov. 2, 2018. U.S. Provisional Patent Application Ser. No. 62/755,070 is hereby incorporated herein by reference in its entirety.

FIELD OF THE DISCLOSURE

This disclosure relates generally to vehicles and, more particularly, to methods and apparatus to generate vehicle warnings.

BACKGROUND

Known automated vehicle driving systems with collision avoidance typically rely on first-person observations to detect potential accidents and react accordingly. In particular, calculations to detect potential accidents often rely on first-person sensor data of an ego vehicle (e.g., a first-person vehicle with sensor capabilities) that indicates information about other vehicles or objects in its path. Movement of the ego vehicle can be adjusted to reduce a probability of a collision.

BRIEF DESCRIPTION OF THE DRAWINGS

FIG. 8 illustrates example identifying attributes of a vehicle that may be stored by the communication manager in accordance with teachings of this disclosure.

FIGS. 9A-13 illustrate example accident probability computations that may be performed by the example collision avoidance system of FIG. 1 and/or FIG. 2.

The figures are not to scale. In general, the same reference numbers will be used throughout the drawing(s) and accompanying written description to refer to the same or like parts.

Figure 1:
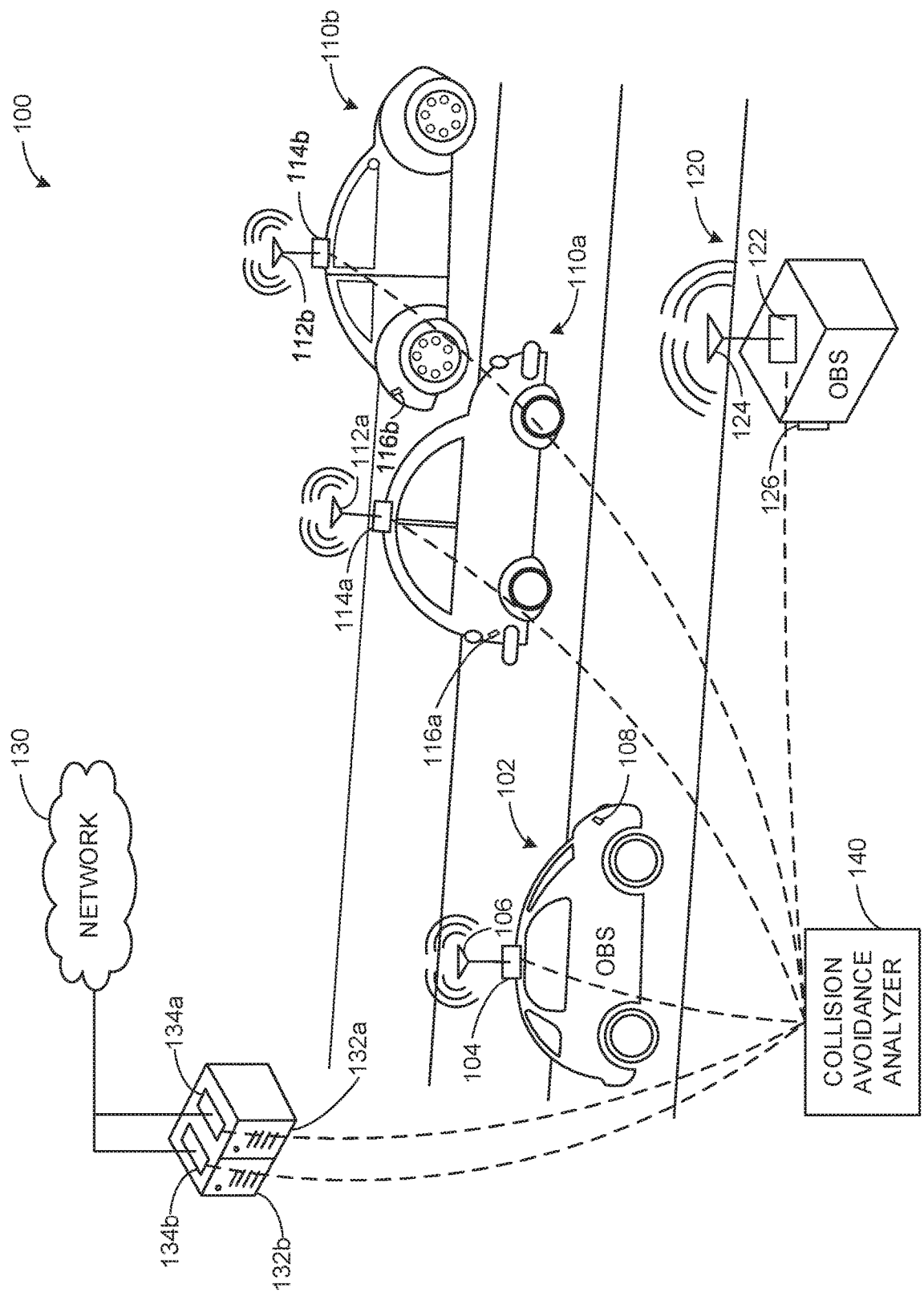
FIG. 1 illustrates an example environment in which a collision avoidance system operates in accordance with the teachings of this disclosure.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Methods and apparatus to generate vehicle warnings are disclosed. Automated vehicles perform object tracking and trajectory planning of surrounding vehicles, but typically do not share predictions and/or sensor observations with other vehicles. In contrast, according to examples disclosed herein, autonomous cars are leveraged to observe a surrounding area and, in turn, provide warnings to other vehicles about potential accidents based on object tracking and prediction capabilities.

In some known systems, a vehicle transmits a lane merge warning in a dedicated short-range communication (DSRC) standard when the vehicle is entering a freeway to warn another vehicle that it is doing a merge. A lane merge warning is limited as it addresses only specific types of accidents (e.g., a freeway on-ramp merge). Other known systems have targeted possible collisions between an ego vehicle and neighboring vehicles. The DSRC standard also has a few other warnings, such as longitudinal collision, intersection collision, etc., but these are warnings based on the ego vehicle making observations involving the ego vehicle. Some known collision warning/avoidance systems employ sensors of a vehicle (e.g., an ego vehicle) to control the vehicle to avoid other vehicles or objects on the road. In particular, some autonomous vehicles can avoid collisions with the vehicles or the objects by being controlled to avoid the vehicles or the objects. However, in such systems the autonomous vehicles may be prevented from sensing other vehicles or objects on the road due to occlusions (e.g., objects blocking a vehicle, barriers, signs, buildings, road objects, etc.) or limited sensor sight angles (e.g., viewing cones associated with sensors). Existing autonomy systems do not utilize an independent observer that informs other vehicles of potential accidents (e.g., an ego vehicle is an observer and reporter of potential accidents between two other vehicles).

Examples disclosed herein leverage capabilities of other vehicles and/or observers in a vicinity and/or area to analyze vehicle and/or object presence or movement. In particular, a scenario can be analyzed based on different vantage points and vehicles that have been tracked for a significant time longer than the ego vehicle has been tracked can be leveraged to effectively predict accidents and/or collisions. As a result, occlusions and/or other sensor/visual blockages of a particular can be prevented from impeding a detection of an impending collision. In other words, a collaborative approach to accident detection is disclosed herein for more effective collision scenario analysis.

Examples disclosed herein enable collision avoidance by utilizing an observer (e.g., an observer vehicle that is not a potential party to the collision, a road-side observer module, a third-party observer, etc.) to sense positions and/or movements of vehicles or objects and determine a likelihood of a collision. Examples disclosed herein reduces collisions by enabling an observer to alert an observed vehicle of an impending collision when the observed vehicle might itself be occluded from observing an object and/or another vehicle associated with the impending collision. Accordingly, when a likelihood of a collision exceeds a threshold, the observer or a control data collector (e.g., a road-side observer module, an in-vehicle observation module, etc.) transmits a message to at least one of the vehicles. The message can include data pertaining to the collision (e.g., a warning message). Additionally or alternatively, the message can include maneuvering information (e.g., a collision map, an adjustment movement to avoid the collision, etc.).

Examples disclosed herein enable safety computations of the ego vehicle to be offloaded to other and/or distributed amongst surrounding vehicles by efficiently utilizing available computational capabilities within a traffic analysis network (e.g., a distributed network, a network of vehicles, an observation network, etc.). Such an implementation enables a collaborative safety approach that can take advantage of the computational abilities of multiple road vehicles and/or observers. For example, when a vehicle is stopped at an intersection, relatively more resources (e.g., compared with a moving vehicle) can be dedicated to tracking and predicting safety threats to other vehicles.

In some examples, multiple observers are used to calculate the likelihood of the collision. In some such examples, an accident estimator of a single vehicle collects and combines data from the observers to calculate the likelihood. In some examples, a collision map is generated to predict a potential collision of an observed vehicle. In some examples, a corrective action (e.g., an adjusted movement, a course adjustment, a braking maneuver, etc.) is determined so that the observed vehicle can be directed to avoid the collision. In some examples, the observer is an autonomous vehicle. Additionally or alternatively, the observer is implemented as a road-side analysis module. In some examples, the observer is communicatively coupled to a network in which remote servers analyze sensor data associated with the observed vehicle and/or objects in a vicinity of the observed vehicle.

In some examples, a Responsibility Sensitive Safety" (RSS) (e.g., an RSS from INTEL®/MOBILEYE®) can be implemented to aid in predicting a possibility of and/or avoiding accidents of other vehicles using object tracking capabilities that exist in many autonomous vehicles. For example, the RSS can perform pairwise checks with perceived obstacles (e.g., vehicles or other objects) and determine lateral and/or longitudinal constraints to aid in avoiding a collision. In some examples, the RSS detects if an accident will happen between an ego vehicle and another vehicle or object at a particular time and then provides the proper control actions/adjustments to avoid. Accordingly, in some examples, there can be situations where a collision is unavoidable, but the RSS operates to aid the ego vehicle and/or other vehicles in avoiding these situations.

FIG. 1 illustrates an example collision avoidance environment 100 in accordance with the teachings of this disclosure. According to the illustrated example, the collision avoidance environment 100 includes a vehicle 102, which is an observer and/or observer vehicle in this example, and vehicles 110 (hereinafter vehicles 110a, 110b), which are observed vehicles in this example. In this example, the vehicle 102 includes a vehicle controller 104, a transceiver 106 (e.g., an antenna, a transmitter/receiver antenna) and a sensor 108. Similarly, the vehicles 110a, 110b each include respective transceivers 112a, 112b, as well as corresponding vehicle controllers 114a, 114b. The example vehicles 110a, 110b also include sensors 116a, 116b, respectively. Further, in some examples, the collision avoidance environment 100 also includes a road-side module 120 (e.g., a road-side analysis module, a road-side detector, a collision analyzer, etc.), which includes an analyzer 122, a transceiver 124 and a sensor 126 (e.g., a camera, a proximity sensor, a motion detector, a speed detector, etc.). Additionally or alternatively, the collision avoidance environment 100 includes a network 130 communicatively coupling servers 132a,132b with respective collision analyzers 134a, 134b. However, any appropriate network topology can be implemented instead. According to the illustrated example, the collision avoidance environment 100 includes an example collision avoidance analyzer 140, which can be implemented in the vehicle controller 104, the vehicle controller 114a, the vehicle controller 114b, the analyzer 122 and/or the collision analyzers 134a, 134b, or any appropriate computing and/or analysis system.

In this example, the vehicles 102, 110a, 110b are autonomous vehicles. In particular, the vehicles 102, 110a, 110b are at least partially controlled via the respective controllers 104, 114a, 114b based on sensor data. However, in other examples, some of the vehicles 102, 110a, 110b may not be implemented as autonomous vehicles (e.g., may be autonomous vehicles that include sensor and/or data communication capabilities).

To prevent a collision of at least one of the vehicles 110a, 110b, the vehicle 102 of the illustrated example acts as an observer. In particular, the sensor 108 collects information related to motion and/or position of the vehicles 110a, 110b. In turn, the vehicle controller 104 calculates a probability of a collision (i.e., a collision probability) of at least one of the vehicles 110a, 110b and/or objects on or proximate a road. If the probability exceeds a threshold, the vehicle controller 104 causes the transceiver 106 to transmit a message (e.g., a collision information message, a warning message, etc.) to at least one of the vehicles 110a, 110b, as appropriate. The message can include information pertaining to the predicted collision and/or a movement adjustment (e.g., a maneuver) so that one or both of the vehicles 110a, 110b can be moved to avoid the predicted collision. For example, the message can include data pertaining to a maneuver and/or possible maneuvers that can be performed by at least one of the vehicles 110a, 110b to avoid the collision. In this example, the transceiver 106 of the vehicle 102 transmits the message to at least one of the transceivers 112a, 112b so that the respective ones of the vehicle controllers 114a, 114b can be used to direct navigation (e.g., autonomous navigation) of the corresponding vehicles 110a, 110b. Accordingly, the predicted collision can be avoided based on maneuvering at least one of the vehicles 110a, 110b (e.g. to avoid a collision with one another, another vehicle, an object on the road, etc.). In some examples, motion of the vehicles 110a, 110b is coordinated (e.g., simultaneously coordinated) to avoid the predicted collision.

According to the illustrated example, communication is initiated between the vehicles 102, 110a, 110b. In particular, prior to messages being transmitted therebetween, communication sessions are authenticated and/or or encrypted. Further, in some examples, messages are each authenticated or verified. Additionally, or alternatively, the example vehicles, 102, 110a, 110b are assigned pseudonyms for facilitating communication therebetween. In particular, the pseudonym schemes can be implemented to transmit messages between vehicles and/or exclude certain vehicles from communication. In some examples, messages from or communications sessions with the road-side module 120 are authenticated and/or encrypted.

A pseudonym may be issued by a pseudonym issuing authority (e.g., the servers 132a, 132b and/or the network 130) and transmitted/forwarded/issued to at least one vehicle (e.g., at least one of the vehicles 102, 110a, 11b) so that messages between vehicles can be verified (e.g., to avoid false messages/observations from being transmitted through Vehicle-to-Vehicle (V2V) communication systems. Accordingly, the pseudonyms assigned to vehicles are used for communication between vehicles. In particular, the pseudonyms can be authenticated and/or verified between the vehicles. In some examples, the pseudonyms are changed by the recipient vehicles. Additionally or alternatively, the pseudonym can be verified by authorities (e.g., law enforcement authorities) via the network 130, for example. In some examples, the pseudonym is revoked (e.g., to be reused, upon unsuccessful verification, etc.). In some examples, the aforementioned pseudonym issuing authority verifies the pseudonyms. In other examples, the vehicles generate their own pseudonyms. In some examples, the pseudonyms and/or messages transmitted throughout the V2V system are encrypted. In other examples, pseudonyms are assigned to a group of vehicles.

In some examples, a pseudonym is determined/designated first to be sent with a broadcast message (e.g., a message from the transceiver 106). Additionally or alternatively, the message is sent without a pseudonym and includes an attribute-based scheme. As used herein, a pseudonym, or alias, is an alternative identity of vehicles in Vehicle-to-Everything (V2X) communication systems. The identity can be assigned across the radio network as a pseudo-random identifier and is verified by a third party authority as pertaining to a vehicle. In some examples, the third-party authority that performs verification does not take into account which vehicle the identifier is attached to, for example.

In some examples, each identifier is bound to a key pair and the public key is certified (e.g., certified by the aforementioned third party authority, certified at the servers 132a, 132b) as belonging to the identifier and the private key. When a packet (e.g., a basic safety message (BSM) or cooperative awareness message (CAM)) is signed using the participant's private key, the packet can be verified by any receiver holding the public key that it comes from an actual vehicle. As a result, when using identifier certificates in this manner, a transmitting vehicle can control a degree to which an identity is concealed or revealed based on how often a respective pseudonym is changed. However, as each pseudonym is independently verified and each verification takes lasts a certain duration, which can be non-trivial. Accordingly, in some examples, V2X communications utilize a cryptographic certificate scheme defined in IEEE 1609.2. The cryptographic basis can be an elliptical curve asymmetric cryptography and, for the application utilizing V2X, can take advantage of some of the capabilities of this branch of mathematics to allow auto generation of new certified identities from a single authorization. Being in the packet header of each message, along with location, speed, etc., the third party can process the packet, locate the sender physically in the space via location received and its sensor input so that it can match the packet to a physical car its sensor detects.

In some examples, communication with fixed infrastructure, such as a road-side unit (RSU) similar to the road-side module 120, is implemented to facilitate collision prediction and, in turn, collision avoidance. In particular, the vehicle 102 (e.g., operating as an observer vehicle) determines that there is a possibility of a collision and, in turn, informs the RSU of a vehicle that the vehicle 102 wants to communicate with based on attributes (e.g., unique identifiers). Accordingly, the RSU converts these attributes to a vehicle identity previously registered with the RSU, for example.

If a pseudonym cannot be identified, another possible manner of accomplishing communication with involved vehicles while excluding others is to broadcast a message in which a body of the message indicates some distinctive characteristics of the recipient (e.g., license number, make and model of the car, color of the car, lane information etc.). These are attributes that can be identified based on observation (e.g., sensor observation). All of the fields do not always need to be known, but these attributes can be used to localize the message to the right recipient. The following steps describe an example scenario utilizing examples disclosed herein utilizing attribute messaging: (1) a vehicle identifies a possible collision threat based on object tracking (e.g., to itself or another vehicle); (2) message(s) are broadcast to nearby vehicles to describe vehicles to which the messages are directed; (3) vehicles receive the message(s) and parse an appropriate attribute field (e.g., only vehicles that match on the attribute field need to parse the message) and (4) validation checks are performed on the message(s) (e.g., to prevent security issues of fake or altered broadcast messages).

In some examples, a majority voting approach or other weighted approach is taken in assessing potential collisions. Additionally or alternatively, behavior is weighted. For example, the weighting can be assigned such that vehicles with the best vantage point and/or having a significant tracking time for the vehicle are assigned higher weights.

In some examples, the accident probabilities from different observers are scored empirically or through machine learning, such as a support vector machine (SVM) or multi-layer perceptron to decide if there is a possibility of an accident.

In some examples, a collision probability is calculated by the servers 132a, 132b. In some such examples, the servers 132a, 132b receive sensor data from one or more of the sensors 108, 116a, 116b, 126 via the network 130 to calculate the collision probability. Additionally or alternatively, the analyzer 122 of the road-side module 120 calculates the probability of a collision. In some such examples, the message is transmitted from the transceiver 124 of the road-side module 120. Additionally or alternatively, observations are reported to a central system(s) (e.g., the servers 132a, 132b) that notify an observer of a predicted collision.

In some examples, vehicles at risk of a collision can receive messages from multiple observers. In some examples, a consensus is built based on multiple messages. In some examples, steps that can be taken prior to validating and building a consensus include pre-charging the brakes, finding alternate paths, etc. In some examples, with validated messages and/or consensus action, other vehicles are informed of a planned action and reasons for the planned action. In some examples, the other vehicles can make appropriate adjustments (e.g., movements to allow vehicles that may have a high probability of colliding to maneuver appropriately).

While the vehicle 102 in this example is designated and/or described as functioning as an observer in this example, any of the vehicles 110a, 110b can also function as an observer. Further, multiple observers can be implemented. In some examples, the vehicles 102, 110a, 110b are identical in terms of functionality (e.g., each of the vehicles 102, 110a, 110b can function as an observer and an adjusted movement actor based on an appropriate scenario or field of view). In other words, in such examples, each of the vehicles can have modular functionality such that none of the vehicles 102, 110a, 110b function only as an observer or only as an actor to avoid a collision. In some examples, the road-side module 120 functions as an observer or is designated to be one of multiple observers.

Figure 2:
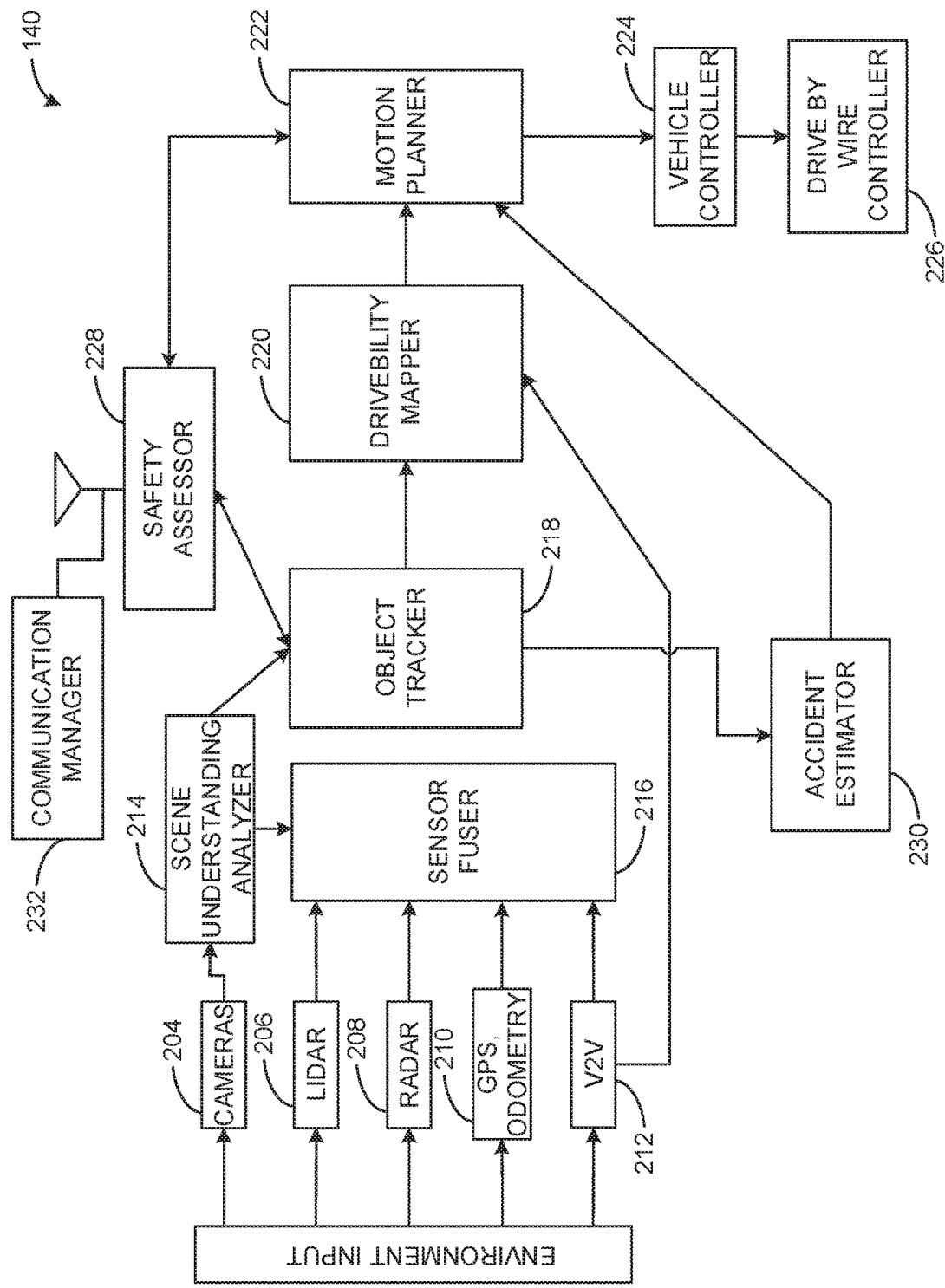
FIG. 2 is a block diagram of an example implementation of the example collision avoidance system of FIG. 1.

FIG. 2 is a block diagram of an example implementation of the example collision avoidance analyzer 140 of the example collision avoidance environment 100 of FIG. 1. As mentioned above in connection with FIG. 1, the example collision analyzer 140 can be implemented in the vehicle controller 104, the vehicle controller 114a, the vehicle controller 114b, the analyzer 122 and/or the collision analyzers 134a, 134b. The collision avoidance analyzer 140 of the illustrated example includes interfaces to cameras 204, light detection and ranging (LIDAR) 206, radio detection and ranging (RADAR) 208, GPS/odometry 210, and V2V communications 212. According to the illustrated example, the collision analyzer 140 includes an example scene understanding analyzer 214, an example sensor fuser 216, an example object tracker 218, an example drive mapper 220, an example motion planner 222, an example vehicle controller 224 and an example drive-by-wire controller 226. The example collision analyzer 140 further includes an example safety assessor 228, an example accident estimator 230 and an example communication manager 232.

To analyze and/or process sensor data (e.g., image data, image files, etc.) from the cameras 204, the example scene understanding analyzer 214 generates a model, spatial model and/or array that represents a spatial representation of an area at or proximate the vehicles 110a, 110b based on the sensor data. In particular, the example scene understanding analyzer 214 analyzes images from the cameras 204 to ascertain positions and/or movements of the vehicles 110a, 110b and/or objects, a presence of traffic signals, a presence of signs, etc. However, the scene understanding analyzer 214 can be used to analyze any appropriate type of information or road/environmental conditions that can be obtained from the sensor data.

To combine and/or analyze sensor data from multiple sensors, the sensor fuser 216 of the illustrated example receives data from the LIDAR 206, the RADAR 208, the GPS/odometry 210 and/or the V2V communications 212. Additionally or alternatively, in some examples, the sensor fuser 216 also receives data (e.g., data pertaining to images from the cameras 204) from the aforementioned scene understanding analyzer 214.

To track a position and/or movement of objects (e.g., objects on the road, vehicles, people or animals on the road, etc.), the object tracker 218 tracks positions and/or motion of objects and vehicles within a requisite range or zone of a vehicle being observed, for example. Additionally or alternatively, a velocity, speed and/or heading of the objects or the vehicles within the requisite range or zone is monitored by the object tracker 218. In other words, motion of the objects and the vehicles are tracked by the example object tracker 218 so that the object tracker 218 can determine a state associated with the objects (e.g., a position and/or heading of a vehicle relative to other vehicles and/or objects).

According to the illustrated example, the drivability mapper 220 determines and/or calculates possible motion adjustment (e.g., maneuvers, coordinated maneuvers) of vehicles to reduce (e.g., eliminate) a probability of a collision. In this particular example, the drivability mapper 220 calculates various routes and/or maneuvers (e.g., lane switching, speed adjustment, braking, swerving, etc.). In some examples, the drivability mapper 220 determines multiple maneuvering routes with associated predicted risk values so that one of the maneuvering routes can be selected.

The example motion planner 222 selects a maneuvering route based on available maneuvers in conjunction with predicted risk values. In some examples, the motion planner 222 selects coordinated maneuvers of multiple vehicles to reduce a likelihood of the collision. In other words, the motion planner 220 can direct the movement of one vehicle or multiple vehicles (e.g., movement of multiple vehicles in concert).

According to the illustrated example, the vehicle controller 224 directs movement of a vehicle (e.g., the vehicle 102, 110a, 110b). In particular, the vehicle controller 224 directs the example drive-by-wire controller 226 to control steering, acceleration and/or braking during a selected maneuver.

The safety assessor 228 and/or the accident estimator 230 of the illustrated example calculates a likelihood of a collision based on data from the example object tracker 218. Further, the example safety assessor 228 also compares the likelihood to a threshold (e.g., a collision avoidance threshold, a safety threshold, etc.). Accordingly, if the likelihood exceeds the threshold, the safety assessor 228 directs the motion planner 222 to cause the vehicle controller 224 to adjust a movement and/or position of the vehicle. In some examples, the threshold is equal to zero or a relatively low value. Additionally or alternatively, the safety assessor 228 causes the communication manager 232 to transmit a message to another vehicle to direct movement of that vehicle. The message to be transmitted can include information related to a predicted collision and/or a calculated maneuver to avoid the collision.

The communication manager 232 of the illustrated example manages and/or authenticates communication between multiple vehicles (e.g., the vehicles 102, 110a, 110b). In this example, V2X communications between the vehicles are employed. For example, autonomous automotive vehicles (e.g., the vehicles 102, 110a, 110b), and other nodes (e.g., the road-side module 120) in an environment may utilize one or more of V2V, Vehicle-to-Infrastructure (V2I), Vehicle-to-Network (V2N), or Vehicle-to-Pedestrian (V2P) communication protocols that allow the autonomous automotive vehicles and other nodes to communicate with other nodes (e.g., stationary nodes) in the environment. Automotive vehicles in this environment can include all and/or others than the previously mentioned methods of communication are considered to encompass V2X communications. Accordingly, the V2X communications are characterized as communication between a vehicle and any entity that affects the vehicle. V2X and other internode communication methods can utilize Wireless Local Area Network (WLAN) infrastructure or cellular network infrastructure. When communicating between automotive vehicles in the environment, the automotive vehicles utilize V2V communication. To secure the V2V communications among automotive vehicle nodes in an environment, some automotive vehicles utilize pseudonym schemes. A pseudonym is an identifier for an automotive vehicle that can be changed to prevent observers (e.g., other nodes, a malevolent entity, etc.) that receive broadcast communications from an automotive vehicle from tracking the automotive vehicle over time.

Figure 3:
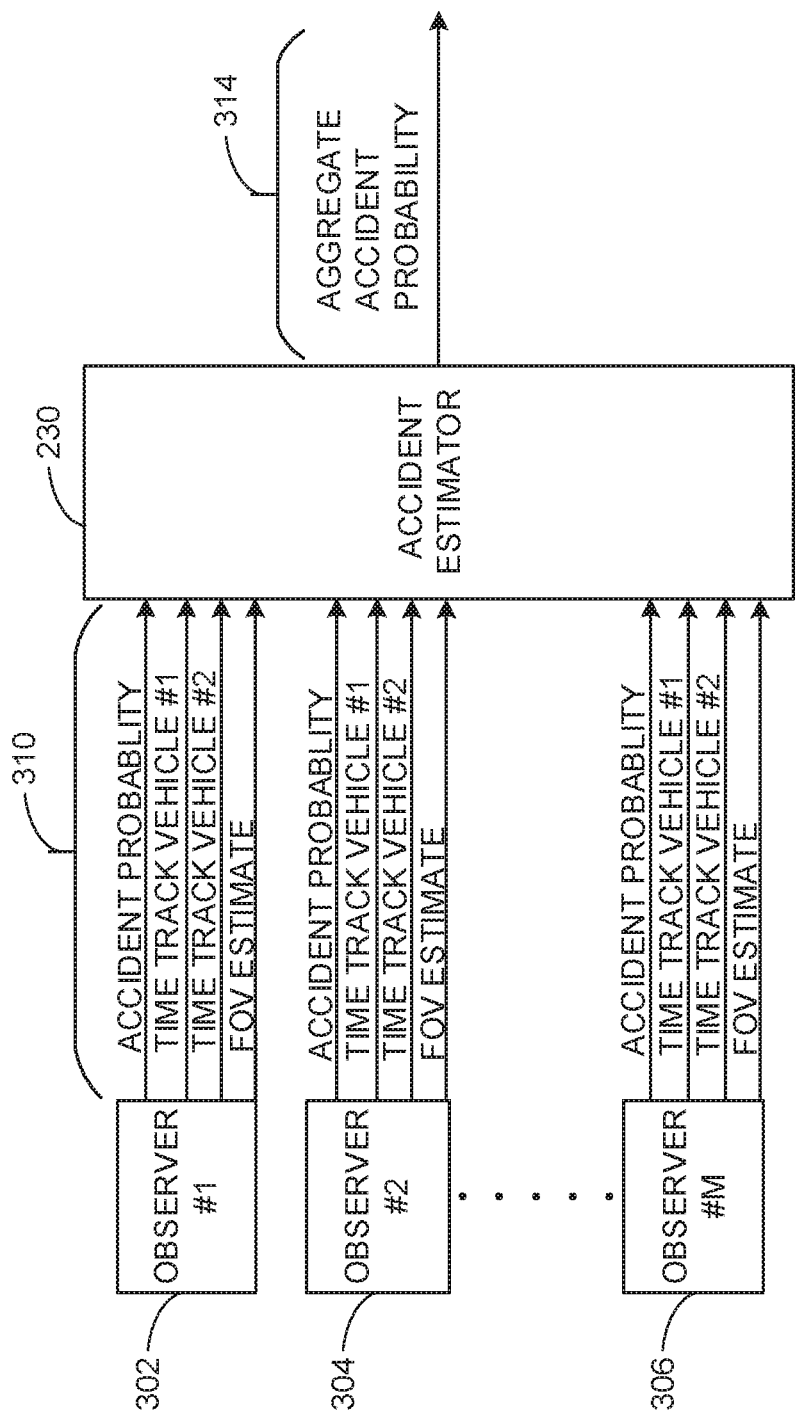
FIG. 3 illustrates an example data analysis that may be performed by an example accident estimator of the collision avoidance system of FIG. 1 and/or FIG. 2.

FIG. 3 illustrates an example data analysis (e.g., data flow) that can be implemented by the example accident estimator 230 of the collision avoidance system 140 of FIG. 1 and/or FIG. 2. In this example, the accident estimator 230 is in communication (e.g., wireless communication) with m-number observers 302, 304, 306. Accordingly, the observers 302, 304, 306 provide observation data 310, which can include collision/accident probability, vehicle tracking and/or field of view (FOV) estimates, to the example accident estimator 230. In turn, the example accident estimator 230 calculates an aggregate accident probability 314. In this example, the accident estimator 230 utilizes observations from the multiple observers 302, 304, 306 to analyze circumstances and/or conditions related to potential collisions and/or associated probabilities. As a result, the accident estimator 230 provides the aggregate accident probability 314 to the motion planner 222 (shown in FIG. 2).

While an example manner of implementing the example collision avoidance analyzer 140 of FIG. 1 and/or FIG. 2 is illustrated in FIG. 2, one or more of the elements, processes and/or devices illustrated in FIG. 2 may be combined, divided, re-arranged, omitted, eliminated and/or implemented in any other way. Further, the example scene understanding analyzer 214, the example, sensor fuser 216, the example object tracker 218, the example drive mapper 220, the example motion planner 222, the example vehicle controller 224, the example drive-by-wire controller 226, the example safety assessor 228, the example accident estimator 230, the example communication manager 232 and/or, more generally, the example collision avoidance analyzer 140 of FIG. 1 and/or FIG. 2 may be implemented by hardware, software, firmware and/or any combination of hardware, software and/or firmware. Thus, for example, any of the example scene understanding analyzer 214, the example, sensor fuser 216, the example object tracker 218, the example drive mapper 220, the example motion planner 222, the example vehicle controller 224, the example drive-by-wire controller 226, the example safety assessor 228, the example accident estimator 230, the example communication manager 232 and/or, more generally, the example collision avoidance analyzer 140 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, scene understanding analyzer 214, the example, sensor fuser 216, the example object tracker 218, the example drive mapper 220, the example motion planner 222, the example vehicle controller 224, the example drive-by-wire controller 226, the example safety assessor 228, the example accident estimator 230, and/or the example communication manager 232 is/are hereby expressly defined to include a non-transitory computer readable storage device or storage disk such as a memory, a digital versatile disk (DVD), a compact disk (CD), a Blu-ray disk, etc. including the software and/or firmware. Further still, the example collision avoidance analyzer 140 of FIG. 1 and/or FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
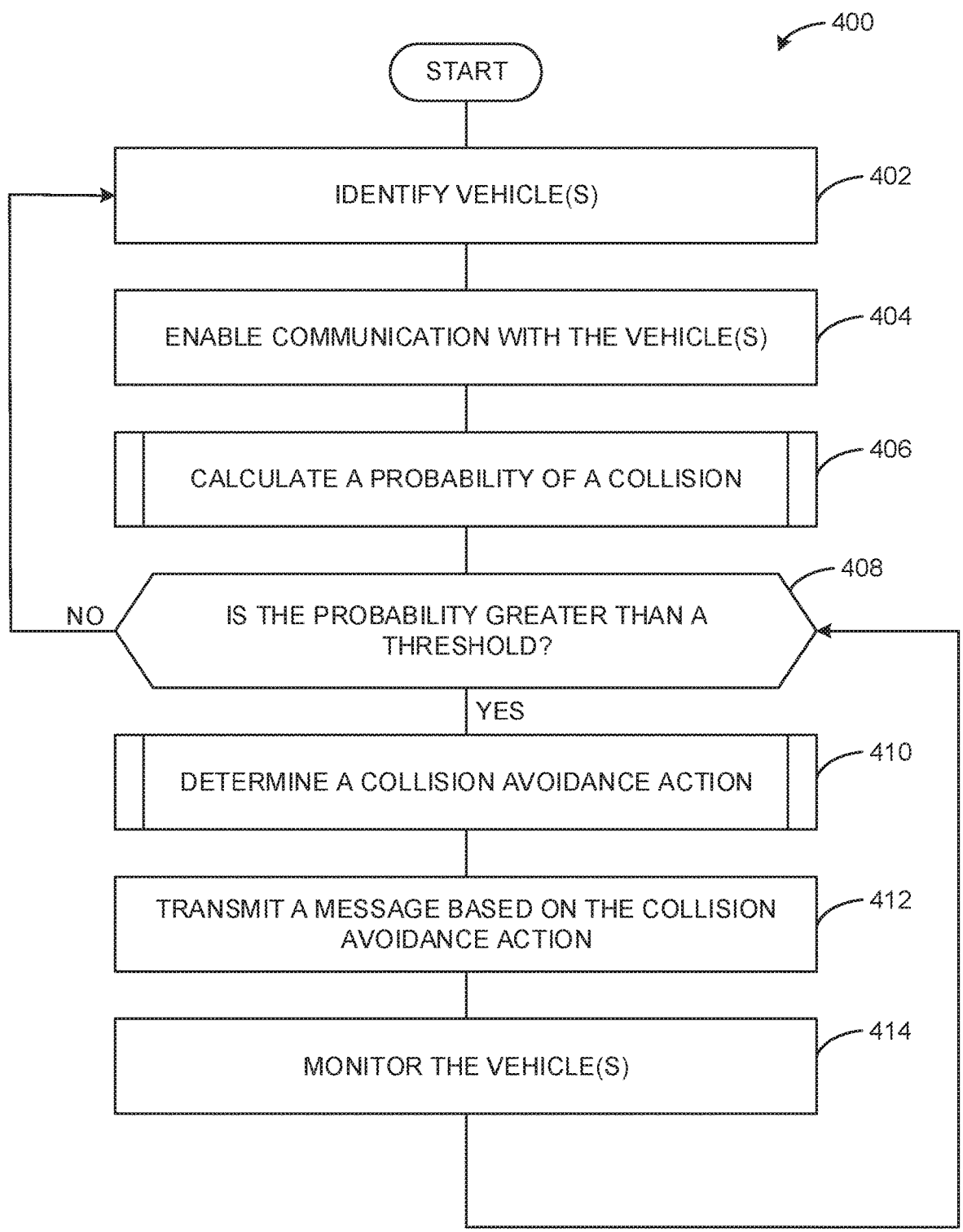
FIGS. 4-6 are flowcharts representative of example machine readable instructions which may be executed to implement the example collision avoidance system of FIG. 1 and/or FIG. 2.
Figure 5:
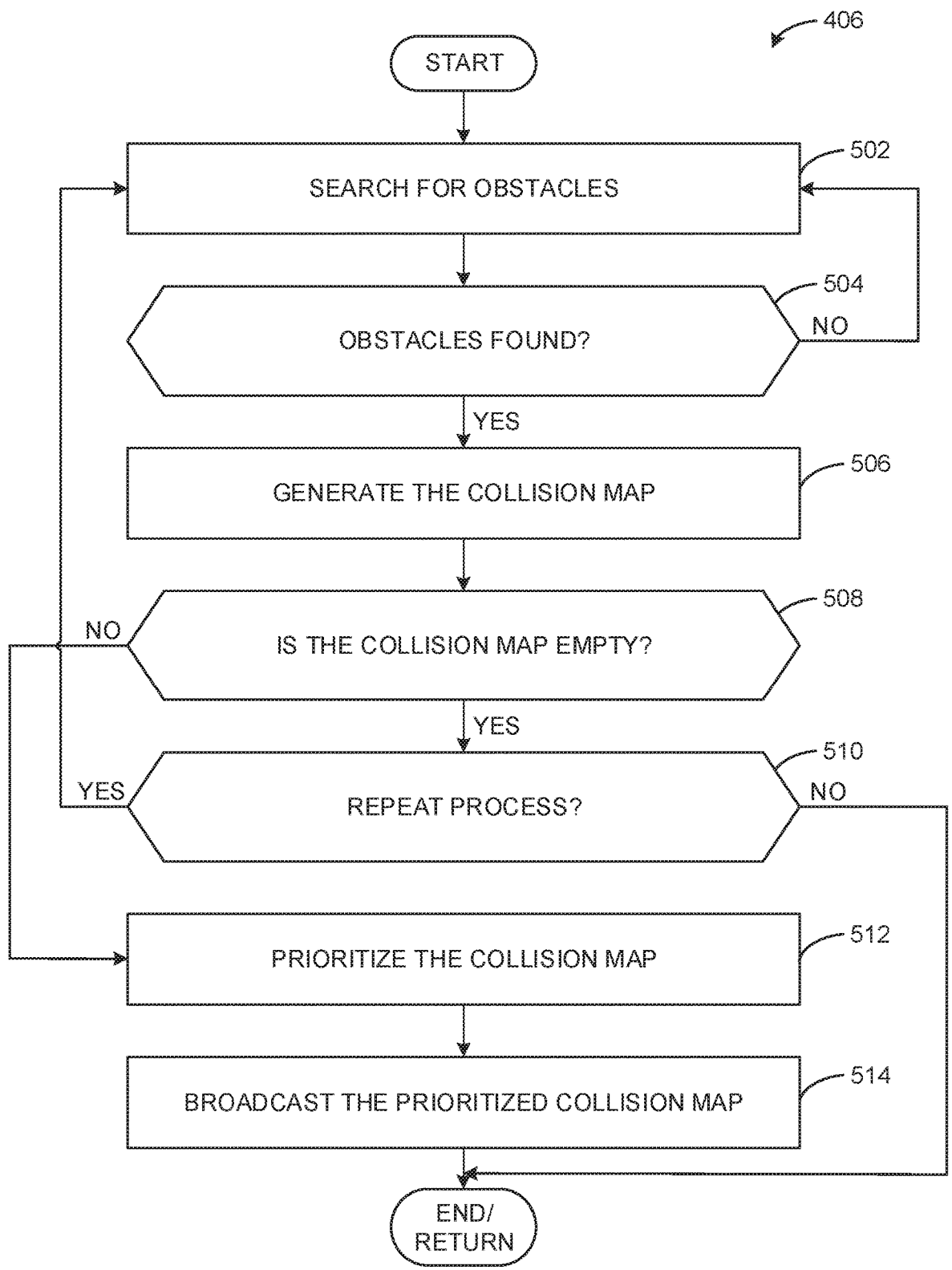
Figure 6:
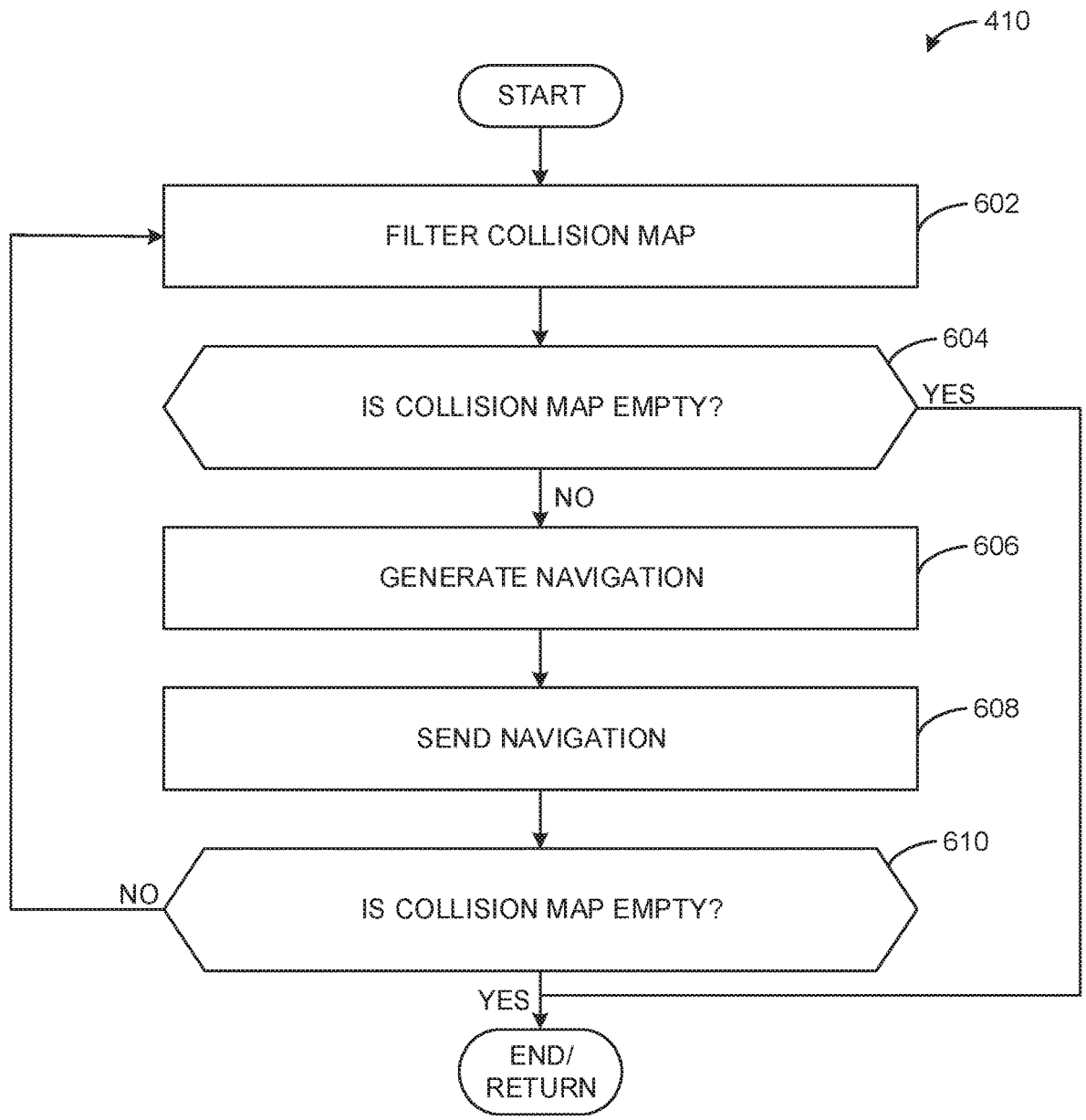

Flowcharts representative of example hardware logic, machine readable instructions, hardware implemented state machines, and/or any combination thereof for implementing the collision avoidance analyzer 140 of FIG. 1 and/or FIG. 2 are shown in FIGS. 4-6. The machine readable instructions may be one or more executable programs or portion(s) of an executable program for execution by a computer processor such as the processor 1412 shown in the example processor platform 1400 discussed below in connection with FIG. 14. The program may be embodied in software stored on a non-transitory computer readable storage medium such as a CD-ROM, a floppy disk, a hard drive, a DVD, a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 4-6, many other methods of implementing the example collision avoidance analyzer 140 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The example method 400 of FIG. 4 begins as the vehicles 102, 110a, 110b are driving on a road within a defined zone or vicinity. In this example, the vehicle 102 is functioning as an observer of the vehicles 110a, 110b. In particular, the example vehicle 102 is assessing whether at least one of the vehicles 110a, 110b will be potentially involved in a collision (e.g., with one another, with an object on the road, etc.).

At block 402, the communication manager 232 and/or the object tracker 218 identifies vehicles. For example, detected vehicles within a region of interest are uniquely identified by the communication manager based on individual vehicle identifiers and/or pseudonyms.

According to the illustrated example, at block 404, the communication manager 232 enables communications between the vehicles 102, 110a, 110b. In particular, the communication manager 232 of the illustrated example manages and maintains the communication between the vehicles 102, 110a, 110b. In some examples, the communication manager verifies a validity of identifiers associated with the vehicles 102, 110a, 110b.

At block 406, the accident estimator 230 calculates a probability of a collision of at least one of the vehicles 110a, 110b. As will be discussed in greater detail below in connection with FIG. 5, the accident estimator 230 generates a collision map to calculate and/or determine the probability, for example. Additionally or alternatively, the safety assessor 228 calculates the probability.

At block 408, the safety assessor 228 determines whether the calculated probability is greater than a threshold (e.g., a collision likelihood probability threshold). If the probability is greater than the threshold (block 408), control of the process proceeds to block 410. Otherwise, the process returns to block 402.

According to the illustrated example, at block 410, the motion planner 222 determines a collision avoidance action (e.g., an adjustment of movement, a maneuver to reduce a probability of a collision, etc.) of at least one of the aforementioned identified vehicles. As will be discussed below in connection with FIG. 6, the collision avoidance action can be based on a collision map, for example.

At block 412, a command and/or message based on the collision avoidance action is transmitted by the communication manager 232, for example, to at least one of the identified vehicles.

At block 414, the vehicle(s) is/are monitored by the object tracker 218 of the illustrated example and control of the process returns to block 408.

Turning to FIG. 5, the subroutine 406 of FIG. 4 is shown. In this example, the subroutine 406 is used by the accident estimator 230 and/or the safety assessor 228 to predict and/or determine a probability of a collision associated with vehicles that are being observed. In this example, the accident estimator 230 performs this analysis based on data from the object tracker 218.

At block 502, the object tracker 218 of the illustrated example searches for obstacles. In particular, the example object tracker 218 utilizes sensor data from the cameras 204, the LIDAR 206, the RADAR 208, the GPS, odometry 210 and/or the V2V communications 212 via the sensor fuser 216 to seek and/or determine a presence of obstacles and/or objects (e.g., stationary obstacles, other vehicles, etc.) within a proximity, P, of sensor capability range(s).

At block 504, it is determined by the object tracker 218 as to whether obstacles have been found. If at least one obstacle has been found (block 504), control of the process proceeds to block 506. Otherwise, the process returns to block 502.

At block 506, the drivability mapper 220 and/or the accident estimator 230 of the illustrated example develops and/or generates a collision map. In this example, the collision map represents a spatial representation of one or more potential collisions between an observed vehicle and an identified object within vicinity of the observed vehicle. In some examples, predictions associated with the collision map are restricted to a designated amount of time in the future.

At block 508, it is determined by the drivability mapper 220 and/or the accident estimator 230 as to whether the aforementioned collision map is empty. If the collision map is empty (block 508), for example, control of the process proceeds to block 510. Otherwise, the process proceeds to block 512.

At block 510, the example accident estimator 230 determines whether the process is to be repeated. If the process is to be repeated (block 510), control of the process returns to block 502. Otherwise, the process ends/returns.

At block 512, the drivability mapper 220 and/or the accident estimator 230 prioritizes the collision map. In particular, the aforementioned c collision map is prioritized, organized and/or sorted based on rules. An example rule includes prioritizing or sorting predicted collision(s) associated with the collision map based on a priority rule. In some examples, the priority rule defines a hierarchy or ranking of collisions to be avoided (e.g., a priority list going from highest priority to lowest priority in this order: (a) loss of life (b) collisions involving person, (c) property damage and (d) closest in time proximity, etc.).

At block 514, the prioritized collision map is broadcast. In some such examples, the prioritized collision map is transmitted as a message to affected vehicle(s) to avoid a collision and the process ends/returns. Additionally or alternatively, warning messages are transmitted to the affected vehicle(s). In some examples, the messages are transmitted to vehicles based on an order (e.g., a priority order, a likelihood of a severe collision order, collision hierarchy rules, etc.) defined by the prioritized collision map.

In known systems, safety estimation approaches like the aforementioned RSS are performed only on an ego vehicle. In contrast, examples disclosed herein extend concepts similar to RSS by utilizing vehicles and/or observers to compute RSS for other observed vehicles and/or vehicle pairs in contrast to only performing RSS on itself. As a result, an RSS index for $_NC_2$ pair of vehicles are calculated, where N is the number of vehicles around a neighborhood. This can be computationally complex.

There are a number of ways to reduce the aforementioned computational complexity including reducing or limiting a number of vehicles (or vehicle pairs) that are applied with safety estimates. In some examples, this can be accomplished by focusing an analysis on vehicles in the same lanes or adjacent lanes. Further, the neighboring vehicles currently observed in the recent past can be limited. Additionally or alternatively, vehicles that have not been tracked for a significant time or vehicles having a poor field of view (FOV) can be eliminated. In some examples, vehicles that do not alter trajectory frequently can have a reduced frequency of safety checks. In some examples, heuristics can be applied based on what scenarios are needed to apply the safety check (e.g., at on-ramps, intersections, lane changes, etc.). Also, multiple hypothesis can be pre-computed during the ego vehicle's idle time and at run-time we use one of the hypothesis if it comes true.

Another example adjustment (e.g., optimization) can be performed when a vehicle detects a possible collision scenario and then transmits a broadcast to involved vehicles. In some examples, a vehicle parses a packet and then runs a safety estimate check to validate a probability of a collision as a high priority task. Accordingly, in some examples, other vehicles can corroborate the collision probability or generate an alternate possible scenario.

Turning to FIG. 6, the subroutine 410 of FIG. 4 is shown. According to the illustrated example, collision avoidance navigation and/or maneuvers are calculated by the drivability mapper 220 and/or the motion planner 222.

At block 602, the aforementioned collision map is filtered. In particular, collision map entries that are associated with a high probability (e.g., a certainty) are removed by the safety assessor 228 so that alternative routes can be calculated. Additionally or alternatively, time need to take action(s) to reduce a probability of a collision is also calculated.

At block 604, it is determined by the drivability mapper 220 and/or the motion planner 222 as to whether the collision map is empty. If the collision map is empty (block 604), the process ends/returns. Otherwise, the process proceeds to block 608.

At block 608, navigation (e.g., an adjusted movement, a maneuver, etc.) is generated and/or calculated by the motion planner 222, for example. In some examples, at least one top priority entry from the collision map is focused on. Accordingly, the navigation is calculated to avoid and/or highly reduce a probability of a collision. In some examples, time-specific constraints on scheduling and/or navigation are taken into account to generate and/or calculate the navigation. In other words, a recommended navigation is calculated to significantly reduce a likelihood of a collision (e.g., taking into account priority rules).

At block 610, in some examples, a message including the calculated navigation is transmitted. In some such examples, the message includes a recommended navigation to all potentially impacted vehicles involved in a potential collision. In other examples, the message includes data indicating the potential collision.

At block 612, it is determined whether the collision map is empty. If the collision map is empty (block 612), the process ends/returns. Otherwise, the process returns to block 608.

Figure 7:
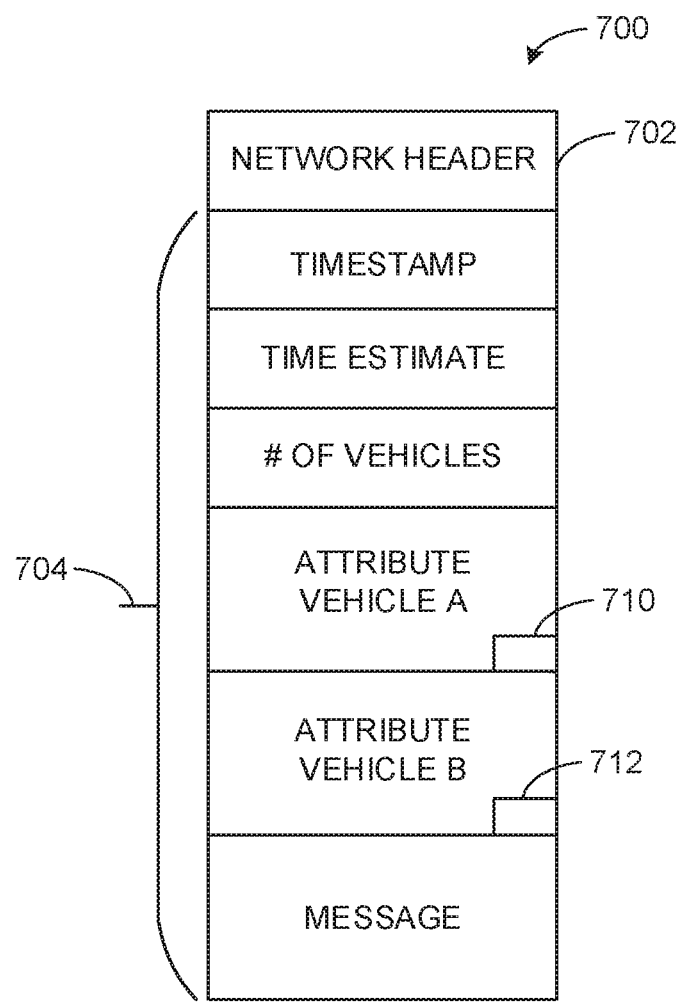
FIG. 7 illustrates an example message that may be generated by a communication manager of the example collision avoidance system of FIG. 1 and/or FIG. 2 in accordance with teachings of this disclosure.

FIG. 7 illustrates an example message 700 (e.g., a data packet, a transmission message, etc.) 700 that may generated by the communication manager 232 of FIG. 2 in accordance with teachings of this disclosure. In particular, the message 700 can be implemented as messages sent between the vehicles 102, 110a, 110b, the road-side module 120 and/or the network 130, for example. The example message 700 includes a network header 702 and data attributes 704. In this example, the data attributes include a timestamp, a time estimate (e.g., a time to a predicted event, etc.), a number of vehicles in which the respective message is intended for, attribute(s) A for a first vehicle, attribute(s) B for a second vehicle, and a message (e.g., message contents, message payload, etc.). However, any appropriate combination of attributes can be implemented instead.

According to the illustrated example, the attribute(s) A includes an end-of-field indicator 710. Likewise, the attribute(s) B also includes a respective end-of-field indicator 712. In this example, the message includes information pertaining to a collision probability, an amount of time that a vehicle has been tracked, vantage point information, field of view information, etc. However, the message can include any appropriate information and/or data pertaining to at least one vehicle being observed.

FIG. 8 illustrates example identifying attributes 800 of a vehicle that may be stored in the example communication manager 232 in accordance with teachings of this disclosure. In this example, the attributes 800 are used to identify a vehicle. Further, attribute codes (e.g., attribute subsets, attribute categories, etc.) 802 are used to designate specific attribute types. According to the illustrated example, attribute details 804 correspond to the aforementioned attribute code 802. In this example, the attribute details 804 include license plate, color, vehicle, type, manufacturer/make, model, lane (e.g., lane number, lane identifier), position (e.g., location) and speed. However, any other attributes and/or descriptors can be implemented instead.

In some examples, the attribute details are utilized to define a pseudonym (e.g., a generated pseudonym). In some such examples, the pseudonym can be generated by an observing vehicle and/or the network 130. In some other examples, the pseudonym is self-generated. Additionally or alternatively, the pseudonym is privatized and/or scrambled to conceal private/personal information.

FIGS. 9A-13 illustrate example accident probability computations that can be implemented in examples disclosed herein. In particular, the example collision avoidance analyzer 140 of FIG. 1 and/or FIG. 2 can be implemented to reduce a probability of a collision, as illustrated in the examples of FIGS. 9A-13.

Figure 9C:
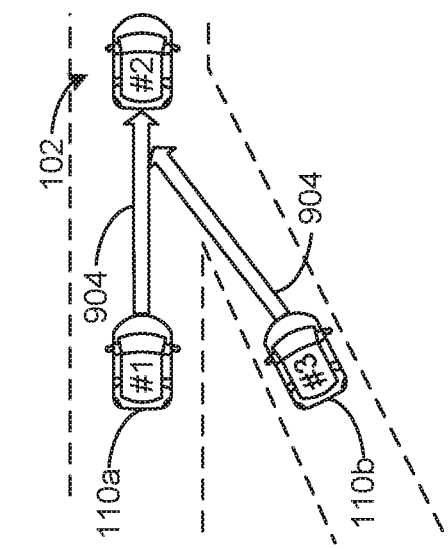
Figure 9B:
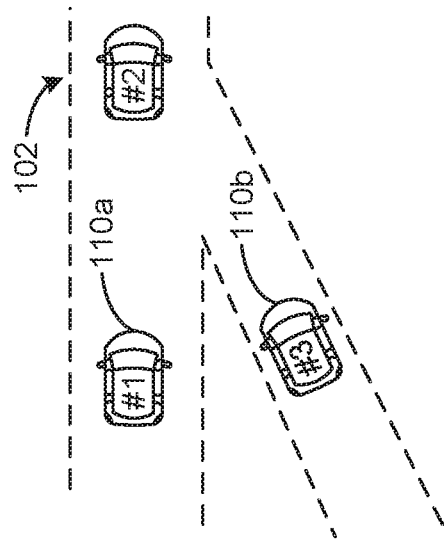
Figure 9A:
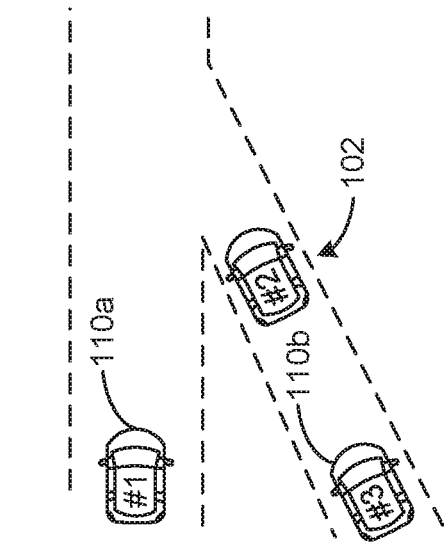

Turning to FIGS. 9A-9C, a time sequence of events leading up to an avoidance of a predicted collision is illustrated. In this example, the vehicle 110a cannot determine/sense that the vehicle 110b is trying to enter the road due to tree cover occlusions. Further, the vehicle 102, on the other hand, can sense (e.g., is not occluded from viewing) the vehicle 110a and the vehicle 110b. Accordingly, the vehicle 102 is in a position to ensure that the collision does not take place between the vehicles 110a, 110b. In this example, the vehicle 102 employs an object tracking algorithm that determines a state estimate of the vehicle 110b due to the vehicle 110b also being on the same on-ramp to enter the highway. Further, the vehicle 102 has also detected the vehicle 110a. Based on the trajectory estimate, the vehicle 102, in regard to the vehicles 110a, 110b, calculates an estimate of a probability of a collision. Once the vehicle 102 has performed the calculation of the probability and if the probability exceeds a threshold, the vehicle 102 communicates with at least one of the vehicles 110a, 110b. In particular, the vehicle 102 transmits a message that indicates a predicted collision and/or includes data pertaining to a movement adjustment to avoid the predicted collision.

In this example, there is only one observer (i.e., the vehicle 102). However, in some examples, there may be multiple observers, observer units (e.g., road-side observation boxes such as the road-side module 120) and/or multiple vehicles performing object tracking. In some examples, vehicles that have a good vantage point and have been tracking the vehicles 110a, 110b can report and/or transmit message(s) on any potential collisions. The observers that anticipate a significant possibility of an accident can broadcast their concern to vehicles that they suspect could be involved in an accident. In some examples, vehicles involved in a potential collision make a judgement by building a consensus amongst multiple reports from multiple observers. Prior to building this consensus, the vehicle could take some early measures such as slow down, pre-charging the brakes etc.

FIGS. 10A-10C depict a second example scenario in which examples disclosed herein can be implemented. In this example, a four-way intersection is shown and the vehicle 102 is properly crossing the intersection on an amber light while the vehicle 110b does not stop when the vehicle 110b sees the amber light and "jumps" the red light. As a result, the vehicle 110b can potentially collide with the vehicle 110a. This example illustrates an increase in probability of an accident by the vehicle 110a being prevented from seeing/sensing the vehicle 110b due to foliage, occlusions and/or other obstructions. According to examples disclosed herein, this collision can be prevented by the vehicle 102. Turning to FIG. 10B, trajectory planning illustrates the possibility of a future collision because the light has turned red and the vehicle 110b has not shown an indication of stopping. According to examples disclosed herein, the vehicle 102 can direct (e.g. transmit a message to) the vehicle 110a to delay accelerating and/or stop even though the light has turned green to avoid a collision with the vehicle 110b.

Figure 11:
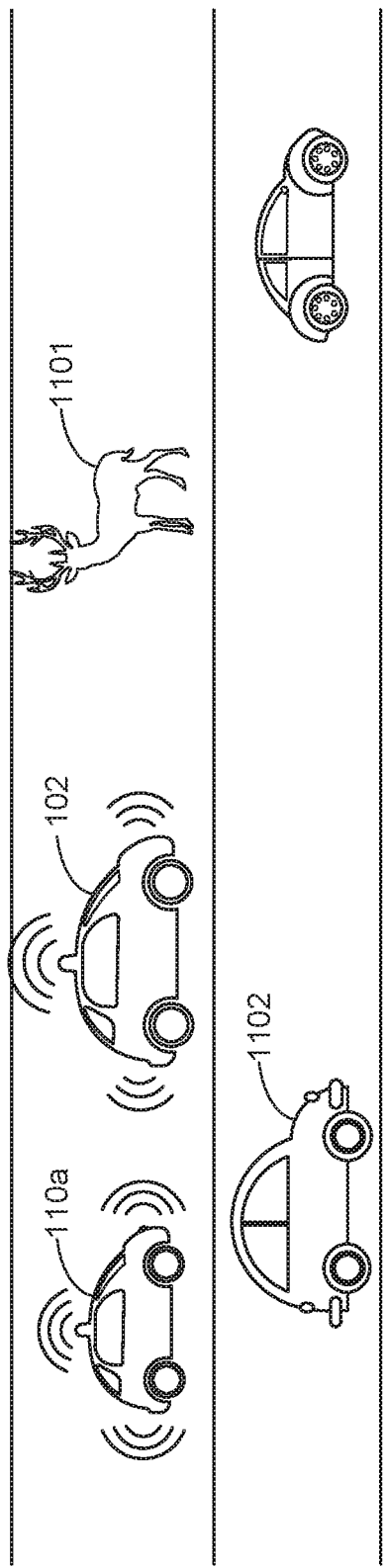

As can be seen in the example of FIG. 11, the vehicle 102 is driving along a freeway and detects an obstacle (e.g., a piece of debris, an animal, an object o on the road, etc.) 1101 ahead in its lane. Further, in this example, another vehicle 1102 is on an adjacent lane to that of vehicles 102, 110a. The autonomous driving software of the example vehicle 102 can determine a maneuver around the obstacle 1101 for the vehicle 102 to avoid the debris. However, the vehicle 110a is following behind the vehicle 102 and, therefore, cannot detect the obstacle 1101 due to the vehicle 102 occluding the obstacle 1101. By the time the vehicle 102 goes around the obstacle, it can be too late for an autonomous driving system of the vehicle 110a to be able to construct a safe path around the obstacle 1101, especially considering a relative position of the vehicle 1102. However, in this example, the vehicle 102 communicates the location and type of the obstacle 1101 to the vehicle 110a via a message as the obstacle 1101 is detected, and, as a result, the vehicle 110a has more time to react and/or determine a maneuver to avoid a collision with the obstacle 1101. In some examples, the aforementioned message includes data pertaining to potential maneuver(s) to avoid and/or reduce a probability of the collision.

Figure 12:
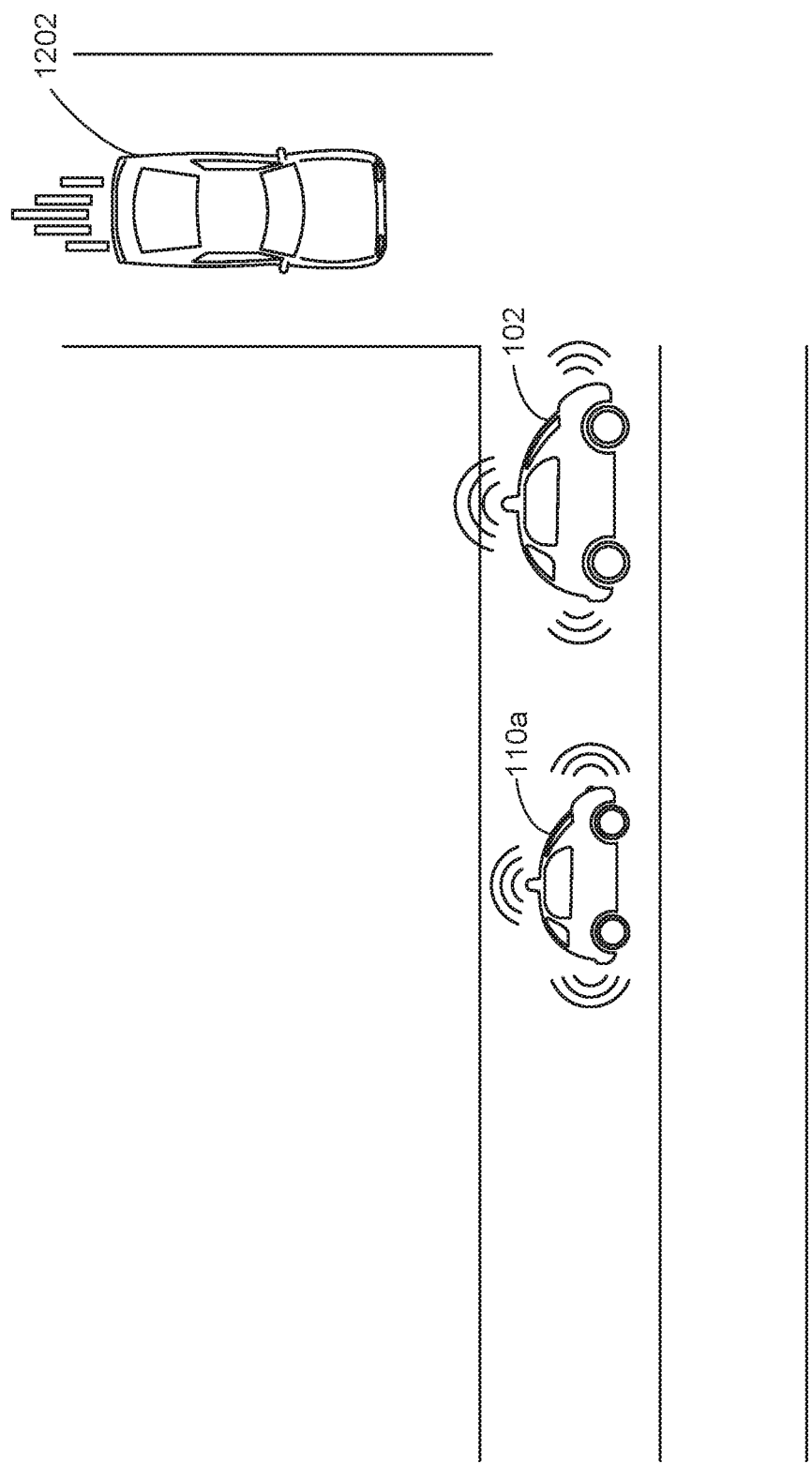

Turning to the example of FIG. 12, the vehicle 102 is approaching an intersection and is followed by the vehicle 110a. According to the illustrated example, the vehicle 102 detects a vehicle 1202 crossing the intersection at a relatively high speed. In this example, an autonomous driving system of the vehicle 102 computes a relatively safe passage through the intersection (e.g., by accelerating and passing through the intersection before the vehicle 1202 enters the intersection). However, the vehicle 110a cannot detect the vehicle 1202 and, if not alerted in advance, the vehicle 102 predicts that the vehicle 110a and the vehicle 1202 will collide. Accordingly, the example vehicle 102 transmits a message to communicate a location and speed of the vehicle 1202 to the vehicle 110a. As a result of receiving the message, the vehicle 110a calculates a safe passage through the intersection (e.g., slowing down and letting the vehicle 1202 move through the intersection before entering the intersection). However, in other examples, the vehicle 102 calculates the safe passage for the vehicle 110a.

Figure 13:
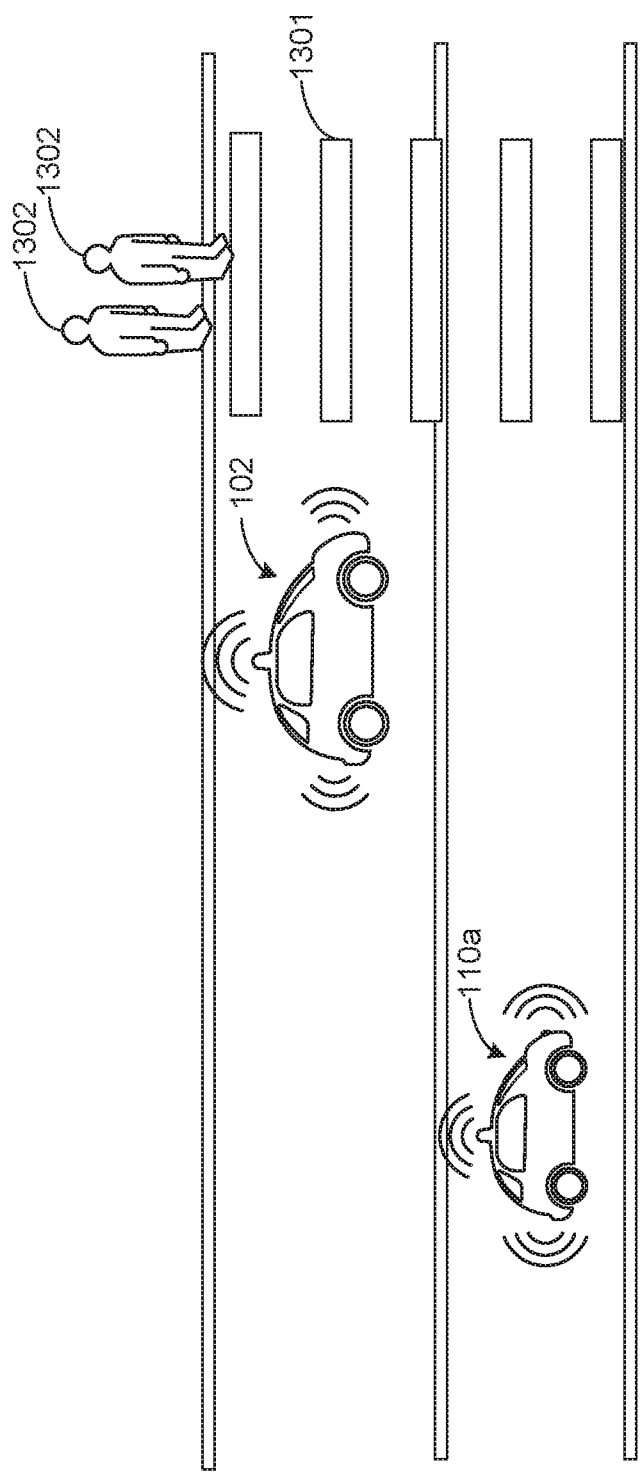

FIG. 13 depicts an additional example scenario in which examples disclosed herein can be implemented. According to the illustrated example of FIG. 13, the vehicle 102 is approaching a crosswalk 1301 and detects pedestrians 1302. As a result, the vehicle 102 stops to let the pedestrians pass. The vehicle 110a is also approaching the crosswalk 1301 in an adjacent lane to that of the vehicle 102. However, the vehicle 110a cannot see the pedestrians 1302 because the vehicle 102 has blocked its view. In this example, the vehicle 102 predicts that the vehicle 110a may hit the pedestrians 1302. Accordingly, the vehicle 102 communicates this information to the vehicle 110a. In some examples, the information includes the location and speed of the pedestrians 1302. As a result, the vehicle 110a stops to avoid hitting the pedestrians 1302.

Figure 14:
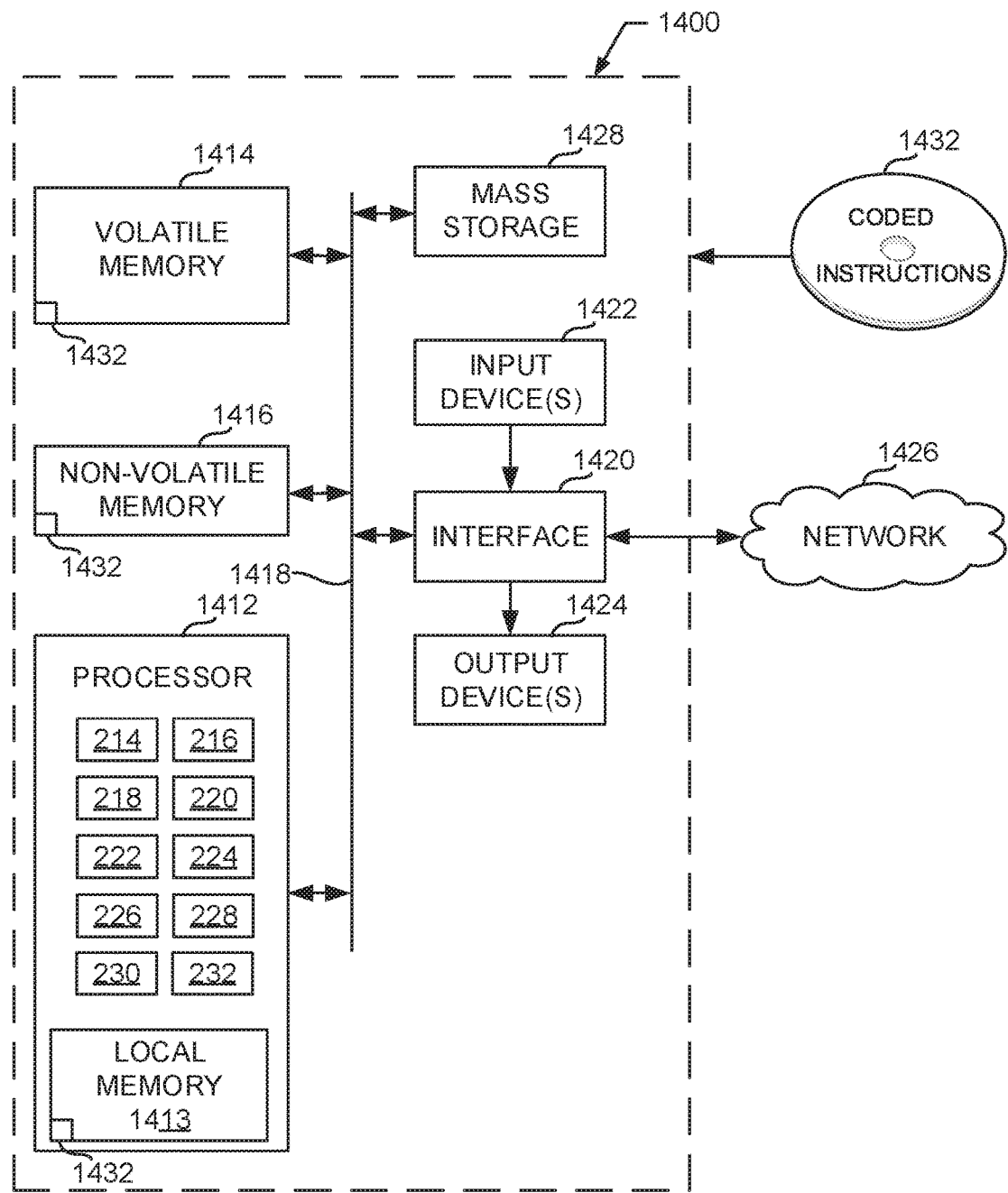
FIG. 14 is a block diagram of an example processing platform structured to implement the instructions of FIGS. 4-6 to implement the collision avoidance system of FIG. 1 and/or FIG. 2.

FIG. 14 is a block diagram of an example processor platform 1400 structured to execute the instructions of FIGS. 4-6 to implement the collision avoidance analyzer 140 of FIG. 1 and/or FIG. 2. The processor platform 1400 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example scene understanding analyzer 214, the example sensor fuser 216, the example object tracker 218, the example drive mapper 220, the example motion planner 222, the example vehicle controller 224, the example drive-by-wire controller 226, the example safety assessor 228, the example accident estimator 230 and the example communication manager 232.

The processor 1412 of the illustrated example includes a local memory 1413 (e.g., a cache). The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), a Bluetooth® interface, a near field communication (NFC) interface, and/or a PCI express interface.

In the illustrated example, one or more input devices 1422 are connected to the interface circuit 1420. The input device(s) 1422 permit(s) a user to enter data and/or commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1420 of the illustrated example, thus, typically includes a graphics driver card, a graphics driver chip and/or a graphics driver processor.

The interface circuit 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, redundant array of independent disks (RAID) systems, and digital versatile disk (DVD) drives.

The machine executable instructions 1432 of FIGS. 4-6 may be stored in the mass storage device 1428, in the volatile memory 1414, in the non-volatile memory 1416, and/or on a removable non-transitory computer readable storage medium such as a CD or DVD.

Example 1 includes an apparatus having a sensor to detect a vehicle, where the sensor is associated with an observer of the vehicle, an object tracker to determine a motion of the vehicle, an accident estimator to calculate a likelihood of a collision of the vehicle based on the determined motion, and a transceiver to transmit a message to the vehicle upon the likelihood of the collision exceeding a threshold, where the message includes information pertaining to the collision Example 2 includes the apparatus of Example 1, and further includes a motion planner to calculate an adjusted movement of the vehicle.

Example 3 includes the apparatus of Example 2, where the message includes the adjusted movement of the vehicle.

Example 4 includes the apparatus of Example 1, and further includes a communication manager to associate the vehicle with a pseudonym.

Example 5 includes the apparatus of Example 1, where the likelihood is calculated based on a collision map.

Example 6 includes the apparatus of Example 5, where the accident estimator generates a prioritized collision map based on the collision map.

Example 7 includes the apparatus of Example 6, where the prioritized collision map is based on collision hierarchy rules.

Example 8 includes a method including calculating, by executing instructions via a processor, a likelihood of a collision of a vehicle based on sensor data from an observer of the vehicle, comparing, by executing instructions via the processor, the likelihood to a threshold, and upon the likelihood exceeding the threshold transmitting, by executing instructions via the processor, a message to the vehicle, the message pertaining to the collision.

Example 9 includes the method of Example 8, and further includes calculating, by executing instructions via the processor, an adjusted movement of the vehicle.

Example 10 includes the method of Example 9, where the message includes the adjusted movement.

Example 11 includes the method of Example 8, and further includes generating, by executing instructions via the processor, a collision map, wherein the likelihood is calculated based on the collision map.

Example 12 includes the method of Example 11, and further includes generating, by executing instructions via the processor, a prioritized collision map based on the collision map.

Example 13 includes the method of Example 8, and further includes associating, by executing instructions via the processor, the vehicle with a pseudonym.

Example 14 includes the method of Example 8, where the likelihood is calculated based on data from multiple observers external to the vehicle.

Example 15 includes a system including an accident estimator to calculate a likelihood of a collision of a vehicle based on sensor data measured at a sensor associated with an observer of the vehicle, and a transceiver, wherein if the likelihood exceeds a threshold, the transceiver is to transmit a message to the vehicle, the message pertaining to the collision.

Example 16 includes the system of Example 15, where the vehicle is a first vehicle and the observer is a second vehicle.

Example 17 includes the system of Example 16, where the collision is predicted between the first vehicle and an object on a road.

Example 18 includes the system of Example 15, where the observer is a road-side module.

Example 19 includes the system of Example 15, where the likelihood is calculated based on a collision map.

Example 20 includes the system of Example 15, where the message includes an adjusted movement of the vehicle.

Example 21 includes a non-transitory machine readable medium comprising instructions, which when executed, cause a processor to at least calculate a likelihood of a collision of a vehicle based on sensor data from an observer of the vehicle, compare the likelihood to a threshold, and when the likelihood exceeds the threshold, transmit a message to the vehicle, the message pertaining to the collision.

Example 22 includes the non-transitory machine readable medium of Example 21, where the instructions cause the processor to determine an adjusted movement of the vehicle.

Example 23 includes the non-transitory machine readable medium of Example 22, where the message includes the adjusted movement.

Example 24 includes the non-transitory machine readable medium of Example 21, where the instructions cause the processor to generate a collision map.

Example 25 includes the non-transitory machine readable medium of Example 24, where the instructions cause the processor to generate a prioritized collision map based on the collision map.

Example 26 includes the non-transitory machine readable medium of Example 25, where the message includes the prioritized collision map.

From the foregoing, it will be appreciated that example methods, apparatus and articles of manufacture have been disclosed that enable effective collision avoidance. Examples disclosed herein enable autonomous vehicles to be maneuvered to reduce a probability of a collision even with objects that are occluded from view. In particular, one or more observers (e.g., observer vehicles, observer modules, etc.) can be used to predict a likelihood of a collision of a vehicle driving on a road and another object (e.g., a vehicle on the road, an object sitting on the road, etc.) that would, otherwise, be occluded from that vehicle. Examples disclosed herein enable calculation of maneuvers of the vehicle to reduce a likelihood of a collision. In some examples, the calculated maneuvers are transmitted via a message from an observer. Additionally or alternatively, the message is a warning message. In some examples. The disclosed methods, apparatus and articles of manufacture improve the efficiency of using a computing device by enabling distributed computational analysis of a potential collision (e.g., amongst multiple observers) and also limiting/narrowing vehicles that are analyzed for a potential collision. The disclosed methods, apparatus and articles of manufacture are accordingly directed to one or more improvement(s) in the functioning of a computer.

This patent claims priority to and the benefit of U.S. Provisional Patent Application Ser. No. 62/755,070, which was filed on Nov. 2, 2018. U.S. Provisional Patent Application Ser. No. 62/755,070 is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While examples disclosed herein are shown related to vehicles operating on a road, examples disclosed herein can be applied to any appropriate collision detection of moving objects and/or satellites, including but not limited to boats, submersibles, unmanned aerial vehicles, aircraft, etc.

What is claimed is:

1. An apparatus comprising:
at least one memory;
instructions in the apparatus; and
at least one processor to execute the instructions to:
 track a vehicle using a first sensor associated with a first observer of the vehicle, wherein a sensor output of the first sensor is to define first information of the vehicle;
 track the vehicle using a second sensor associated with a second observer of the vehicle, wherein a sensor output of the second sensor is to define second information of the vehicle;
 store the first and second information in a database;
 determine a first aggregate amount of time the first sensor tracked the vehicle;
 determine a second aggregate amount of time the second sensor tracked the vehicle;
 compare the first aggregate amount of time to the second aggregate amount of time;
 eliminate the first information from the database when the second aggregate amount of time exceeds the first aggregate amount of time;
 calculate a likelihood of a collision of the vehicle based on the second information; and
 cause the vehicle to maneuver by transmitting a message to the vehicle upon the likelihood of the collision exceeding a collision probability threshold, the message including information pertaining to the collision.

2. The apparatus as defined in claim 1, wherein the at least one processor is to execute the instructions to calculate an adjusted movement of the vehicle.

3. The apparatus as defined in claim 2, wherein the at least one processor is to transmit the message including the adjusted movement of the vehicle.

4. The apparatus as defined in claim 1, wherein the at least one processor is to calculate the likelihood based on a collision map.

5. The apparatus as defined in claim 4, wherein the at least one processor is to generate a prioritized collision map based on the collision map.

6. The apparatus as defined in claim 5, wherein the prioritized collision map is generated by the at least one processor based on collision hierarchy rules.

7. The apparatus as defined in claim 1, wherein the vehicle is a first vehicle and at least one of the first observer or the second observer is a second vehicle, and wherein the second vehicle is to transmit the message to the first vehicle.

8. The apparatus as defined in claim 1, wherein the at least one processor is to execute the instructions to verify a pseudonym of the vehicle based on a pseudonym scheme to determine whether to exclude the vehicle from receiving transmissions.

9. The apparatus as defined in claim 8, wherein the vehicle is a first vehicle, and wherein the message is transmitted from a second vehicle to the first vehicle.

10. The apparatus as defined in claim 9, wherein the pseudonym scheme includes data for verification of an authenticity of the message between the first vehicle and the second vehicle.

11. The apparatus as defined in claim 9, wherein the pseudonym is verified by the at least one processor to prevent a false message between the first vehicle and the second vehicle.

12. The apparatus as defined in claim 8, wherein the pseudonym is verified by a law enforcement authority.

13. The apparatus as defined in claim 8, wherein the vehicle generates the pseudonym based on the pseudonym scheme.

14. The apparatus as defined in claim 8, wherein an agency generates the pseudonym to identify the vehicle.

15. The apparatus as defined in claim 1, wherein the at least one processor is to cause at least one of the first sensor or the second sensor to detect an occlusion, the occlusion at least partially blocking the first sensor from tracking the vehicle such that the first aggregate amount of time is less than the second aggregate amount of time.

16. The apparatus as defined in claim 15, wherein the occlusion is positioned closer to the first sensor than the second sensor.

17. The apparatus as defined in claim 15, wherein the at least one processor is to execute the instructions to calculate the likelihood of the collision based on the occlusion.

18. The apparatus as defined in claim 15, wherein the at least one processor is to execute the instructions to track the occlusion via at least one of the first sensor or the second sensor.

19. The apparatus as defined in claim 18, wherein at least one of a velocity of the occlusion or a position of the occlusion is measured by the at least one of the first sensor or the second sensor.

20. The apparatus as defined in claim 19, wherein the at least one processor is to calculate the likelihood of the collision based on the at least one of the velocity of the occlusion or the position of the occlusion.

21. A method comprising:
tracking, by executing instructions via at least one processor, a vehicle using a first sensor associated with a first observer of the vehicle, wherein a sensor output of the first sensor is to define first information of the vehicle;
tracking, by executing instructions via the at least one processor, the vehicle using a second sensor associated with a second observer of the vehicle, wherein a sensor output of the second sensor is to define second information of the vehicle;
store the first and second information in a database;
determine a first aggregate amount of time the first sensor tracked the vehicle;
determine a second aggregate amount of time the second sensor tracked the vehicle;
comparing, by executing instructions via the at least one processor, the first aggregate amount of time to the second aggregate amount of time;
eliminating, by executing instructions via the at least one processor, the first information from the database when the second aggregate amount of time exceeds the first aggregate amount of time;
calculating, by executing instructions via the at least one processor, a likelihood of a collision of the vehicle based on the second information;
comparing, by executing instructions via the at least one processor, the likelihood to a collision probability threshold; and
cause the vehicle to maneuver by transmitting, by executing instructions via the at least one processor, a message to the vehicle upon the likelihood of the collision exceeding the collision probability threshold, the message pertaining to the collision.

22. The method as defined in claim 21, further including calculating, by executing instructions via the at least one processor, an adjusted movement of the vehicle.

23. The method as defined in claim 22, wherein the message includes the adjusted movement.

24. The method as defined in claim 21, further including generating, by executing instructions via the at least one processor, a collision map, wherein the likelihood is calculated based on the collision map.

25. The method as defined in claim 24, further including generating, by executing instructions via the at least one processor, a prioritized collision map based on the collision map.

26. The method as defined in claim 21, wherein the first and second sensor are associated with multiple observers external to the vehicle.

27. A system comprising:
at least one memory;
instructions; and
at least one processor to execute the instructions to:
access first and second information of a vehicle, the first information obtained using a sensor output of a first sensor associated with a first observer of the vehicle, the second information obtained using a sensor output of a second sensor associated with a second observer of the vehicle;
store the first and second information in a database;
determine a first aggregate amount of time the first sensor tracked the vehicle;
determine a second aggregate amount of time the second sensor tracked the vehicle;
compare the first aggregate amount of time to the second aggregate amount of time;
eliminate the first information from the database when the second aggregate amount of time exceeds the first aggregate amount of time;
calculate a likelihood of a collision of the vehicle based on the second information; and
cause the vehicle to maneuver by transmitting a message to the vehicle if the likelihood exceeds a collision probability threshold, the message pertaining to the collision.

28. The system as defined in claim 27, wherein the vehicle is a first vehicle and at least one of the first observer or the second observer is a second vehicle.

29. The system as defined in claim 28, wherein the collision is predicted between the first vehicle and an object on a road.

30. The system as defined in claim 27, wherein at least one of the first observer or the second observer is a road-side module.

31. The system as defined in claim 27, wherein the likelihood is calculated based on a collision map.

32. The system as defined in claim 27, wherein the message includes an adjusted movement of the vehicle.

33. A non-transitory machine readable medium comprising instructions, which when executed, cause at least one processor to at least:

track a vehicle using a first sensor associated with a first observer of the vehicle, wherein a sensor output of the first sensor is to define first information of the vehicle;

track the vehicle using a second sensor associated with a second observer of the vehicle, wherein a sensor output of the second sensor is to define second information of the vehicle;

store the first and second information in a database;

determine a first aggregate amount of time the first sensor tracked the vehicle;

determine a second aggregate amount of time the second sensor tracked the vehicle;

compare the first aggregate amount of time to the second aggregate amount of time;

eliminate the first information from the database when the second aggregate amount of time exceeds the first aggregate amount of time;

calculate a likelihood of a collision of the vehicle based on the second information;

compare the likelihood to a collision probability threshold; and cause the vehicle to maneuver by transmitting a message to the vehicle when the likelihood exceeds the collision probability threshold, the message pertaining to the collision.

34. The non-transitory machine readable medium as defined in claim 33, wherein the instructions cause the at least one processor to determine an adjusted movement of the vehicle.

35. The non-transitory machine readable medium as defined in claim 34, wherein the message includes the adjusted movement.

36. The non-transitory machine readable medium as defined in claim 33, wherein the instructions cause the at least one processor to generate a collision map.

37. The non-transitory machine readable medium as defined in claim 36, wherein the instructions cause the at least one processor to generate a prioritized collision map based on the collision map.

38. The non-transitory machine readable medium as defined in claim 37, wherein the message includes the prioritized collision map.

* * * * *